(12) United States Patent
Fonseka et al.

(10) Patent No.: US 7,631,926 B2
(45) Date of Patent: Dec. 15, 2009

(54) SIDE IMPACT CRASH EVENT BODY STRUCTURE IMPROVEMENT

(75) Inventors: W. Sanjaya A. Fonseka, Dublin, OH (US); Shawn Lee Tarr, Dublin, OH (US); Jason Thuringer, Watertown, SD (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/866,388

(22) Filed: Oct. 2, 2007

(65) Prior Publication Data

US 2009/0085375 A1     Apr. 2, 2009

(51) Int. Cl.
*B60J 5/04* (2006.01)
(52) U.S. Cl. .............. 296/187.12; 296/146.6
(58) Field of Classification Search ............ 296/29, 296/30, 146.6, 187.12, 193.05, 203.03, FOR. 112, 296/FOR. 113
See application file for complete search history.

(56) References Cited

U.S. PATENT DOCUMENTS

| | | | | |
|---|---|---|---|---|
| 4,462,633 A * | 7/1984 | Maeda | ................. | 296/187.12 |
| 4,488,751 A * | 12/1984 | Kling | ................. | 296/146.9 |
| 4,934,751 A | 6/1990 | Shimoda | | |
| 5,000,509 A * | 3/1991 | Sinnhuber et al. | ........ | 296/187.12 |
| 5,110,176 A * | 5/1992 | Curtis | ................. | 296/187.12 |
| 5,306,066 A * | 4/1994 | Saathoff | ................. | 296/146.6 |
| 5,388,885 A * | 2/1995 | Warren | ................. | 296/203.03 |
| 5,542,738 A * | 8/1996 | Walker et al. | ........... | 296/187.05 |
| 5,857,702 A * | 1/1999 | Suga et al. | .................. | 280/751 |
| 6,036,251 A * | 3/2000 | Yagishita et al. | ............ | 296/39.1 |
| 6,203,096 B1 * | 3/2001 | Noda et al. | ............... | 296/146.6 |
| 6,237,991 B1 * | 5/2001 | Weber | ................. | 296/187.12 |
| 6,299,239 B1 * | 10/2001 | Sagawa et al. | .......... | 296/187.12 |
| 6,364,398 B1 * | 4/2002 | Kim | ................. | 296/146.6 |
| 6,568,745 B2 * | 5/2003 | Kosuge et al. | .......... | 296/193.02 |
| 6,568,747 B2 * | 5/2003 | Kobayashi | ................. | 296/204 |
| 6,758,516 B1 | 7/2004 | Abramczyk et al. | | |
| 6,786,534 B1 | 9/2004 | Peng | | |
| 6,988,762 B2 * | 1/2006 | Carre | ................. | 296/187.12 |
| 7,097,238 B2 | 8/2006 | Fujita | | |
| 7,178,861 B2 | 2/2007 | Yamada et al. | | |
| 7,300,099 B2 * | 11/2007 | Godfrey et al. | ........ | 296/187.12 |
| 7,448,674 B2 * | 11/2008 | Brunner et al. | ........ | 296/193.02 |
| 2001/0017476 A1 * | 8/2001 | Nishikawa et al. | ........ | 296/146.6 |
| 2002/0113459 A1 * | 8/2002 | Laborie et al. | ........... | 296/146.6 |
| 2002/0195833 A1 * | 12/2002 | Fukutomi | ................. | 296/146.6 |
| 2006/0033357 A1 * | 2/2006 | Karuppaswamy et al. | ........ | 296/146.6 |
| 2006/0202513 A1 * | 9/2006 | Matsuda | ................. | 296/187.12 |
| 2007/0052260 A1 * | 3/2007 | Lassl et al. | ............. | 296/187.12 |

(Continued)

FOREIGN PATENT DOCUMENTS

JP       03032989 A    *  2/1991

(Continued)

*Primary Examiner*—Glenn Dayoan
*Assistant Examiner*—Paul A Chenevert
(74) *Attorney, Agent, or Firm*—Mark E. Duell; Rankin, Hill & Clark LLP

(57) ABSTRACT

A vehicle or automotive body includes a floor panel, first and second side sills, connected to, respectively, to opposite side of the floor panel, a cross member extending between the side sills and connected to each side sill, a rear door panel, a first reinforcing structure connected to the rear door panel, and a second reinforcing structure connected to the cross member. The second reinforcing structure is arranged with respect to the first reinforcing structure such that the first reinforcing structure contacts the second reinforcing structure during a side impact crash event to transfer load into the cross member.

20 Claims, 5 Drawing Sheets

U.S. PATENT DOCUMENTS

| | | | |
|---|---|---|---|
| 2007/0063543 A1* | 3/2007 | Roccato et al. | 296/187.08 |
| 2007/0145771 A1* | 6/2007 | Tanaka et al. | 296/146.6 |
| 2007/0152474 A1* | 7/2007 | Lassl et al. | 296/187.12 |
| 2007/0228776 A1* | 10/2007 | Schiebel et al. | 296/187.12 |
| 2008/0093889 A1* | 4/2008 | Yao | 296/187.12 |
| 2008/0252101 A1* | 10/2008 | Koormann et al. | 296/187.12 |

FOREIGN PATENT DOCUMENTS

| | | | |
|---|---|---|---|
| JP | 04362415 A | * | 12/1992 |
| JP | 06166384 A | * | 6/1994 |
| JP | 06270845 A | * | 9/1994 |

* cited by examiner

US 7,631,926 B2

SIDE IMPACT CRASH EVENT BODY STRUCTURE IMPROVEMENT

The present disclosure generally relates to vehicle bodies and relates more particularly to a side impact crash event body structure improvement for a vehicle body.

BACKGROUND

The side impact test conducted by the Insurance Institute of Highway Safety assesses occupant protection when vehicles are struck in the side by SUVs or pickups. Occupant protection assessment is based on the center pillar inner intrusion into the cabin of the vehicle. Vehicle manufacturers attempt to reduce the intrusion of the center pillar to increase the survival space of the cabin.

During a side impact crash event, the load from the event is primarily transferred through the center pillar. Strengthening the center pillar alone, however, has been found to not be an efficient method to improve the survival space in the cabin after a side impact crash event.

SUMMARY

A vehicle or automotive body that overcomes the aforementioned difficulties includes a floor panel, first and second side sills, connected, respectively, to opposite sides of the floor panel, a cross member extending between the side sills and connected to each side sill, a rear door panel, a first reinforcing structure connected to the rear door panel, and a second reinforcing structure connected to the cross member. The second reinforcing structure is arranged with respect to the first reinforcing structure such that the first reinforcing structure contacts the second reinforcing structure during a side impact crash event to transfer load into the cross member.

In an alternative embodiment, a vehicle body includes a floor panel, first and second side sills connected, respectively, to opposite sides of the floor panel, a cross member connected to the floor panel, a rear door panel, a rear door reinforcing beam connected to the rear door panel, a first reinforcing structure connected to the rear door reinforcing beam, and a second reinforcing structure connected to the cross member. The floor panel defines a central axis. The cross member extends in a direction generally perpendicular to the central axis. The rear door panel is movable between an open position and a closed position. The first reinforcing structure includes a contact wall spaced inwardly from the rear door panel toward the cross member. The second reinforcing structure is arranged with respect to the first reinforcing structure such that when the rear door panel is in the closed position the contact wall of the first reinforcing structure contacts the second reinforcing structure during a side impact crash event to transfer load into the cross member.

According to another embodiment, a vehicle body includes a floor panel, a first side sill connected to a first side of the floor panel, a second side sill connected to a second side of the floor panel, a cross member connected to each side sill, an inner rear door panel, an outer rear door panel connected to the inner rear door panel, a first reinforcing structure connected to at least one of the rear door panel and the outer rear door panel, and a second reinforcing structure connected to the cross member. The floor panel defines a central axis. The cross member extends generally perpendicular to the central axis. The outer rear door panel includes a portion spaced from the inner rear door panel. The first reinforcing structure includes a contact surface spaced from the inner rear door panel in a direction away from the outer rear door panel. The second reinforcing structure is arranged with respect to the first reinforcing structure such that the contact surface of the first reinforcing structure contacts the second reinforcing structure during a side impact crash event to transfer load into the cross member.

DETAILED DESCRIPTION

Figure 1:
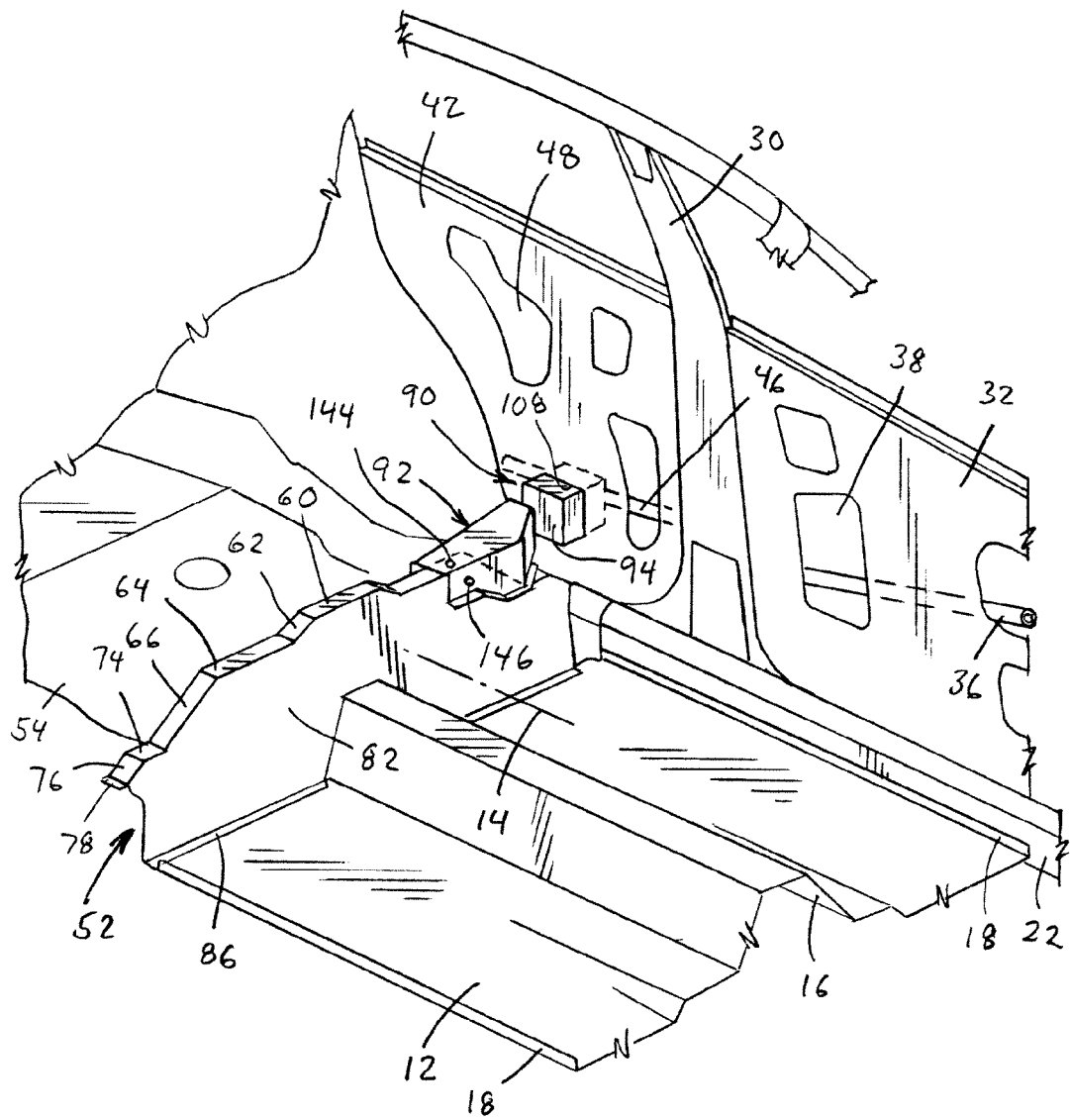
FIG. 1 is a perspective view of a portion of a vehicle body looking from inside the body towards the outside and rearwardly.

The vehicle body, a portion of which is depicted in FIGS. 1-5, includes a floor panel 12 that defines a central axis 14 that runs parallel to the forward and backward direction of travel of the vehicle. The floor panel 12 is a formed sheet of metal that includes a centrally disposed floor tunnel 16 that is aligned with and runs along the central axis 14 of the floor panel. Side flanges 18 depend upwardly from opposite (left and right) sides of the floor panel 12. The side flanges 18 generally run along the left and right side edges, respectively, of the floor panel parallel to the central axis 14. The side flanges 18 provide a surface for attaching side sills 22. Only one side sill 22 is shown in FIG. 1 (on the left side of the vehicle); a second side sill attaches to the other side flange 18. Accordingly, first and second side sills 22 connect, respectively, to opposite sides of the floor panel 12.

Figure 2:
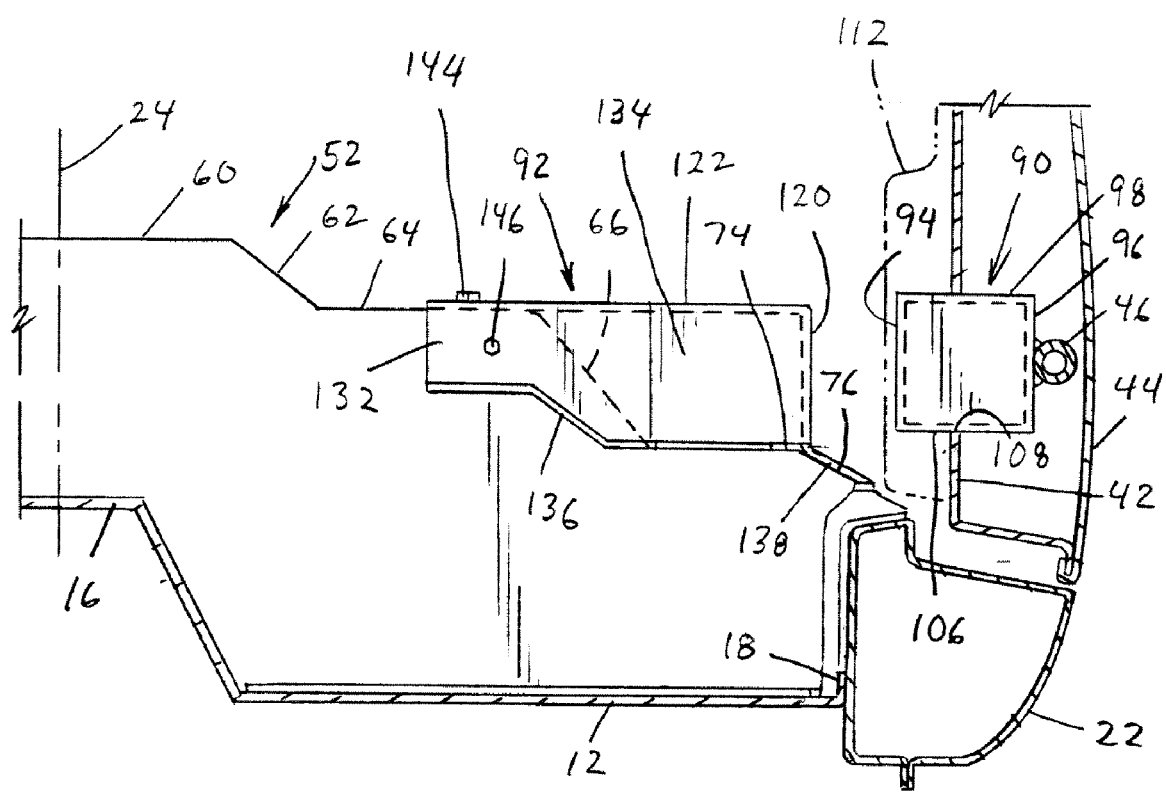
FIG. 2 is a cross-sectional view taken normal to a symmetrical axis of the vehicle showing a lower portion of the vehicle body prior to a side impact crash event.

With reference to FIG. 2, each side sill 22 is generally formed as a hollow member that runs, i.e. has a longitudinal axis, parallel to the central axis 14. In FIG. 2, similar to FIG. 1, only one side sill 22 is shown. An axis of symmetry 24, which is perpendicular to the central axis 14 (FIG. 1), defines a symmetrical plane for the vehicle body in that the vehicle body is the mirror image of itself on opposite sides of the symmetrical plane. Accordingly, for the sake of brevity and the ease of understanding the figures, both sides of the symmetrical plane are not depicted in the figures.

With reference back to FIG. 1, a center pillar 30 rises upwardly with respect to the floor panel 12 and is connected to the side sill 22. Only one center pillar is shown in the figures, however, another center pillar is located on the opposite side of the symmetrical plane, as discussed above. The center pillar 30 in most vehicles is the primary load path for a side impact crash event.

Figure 3:
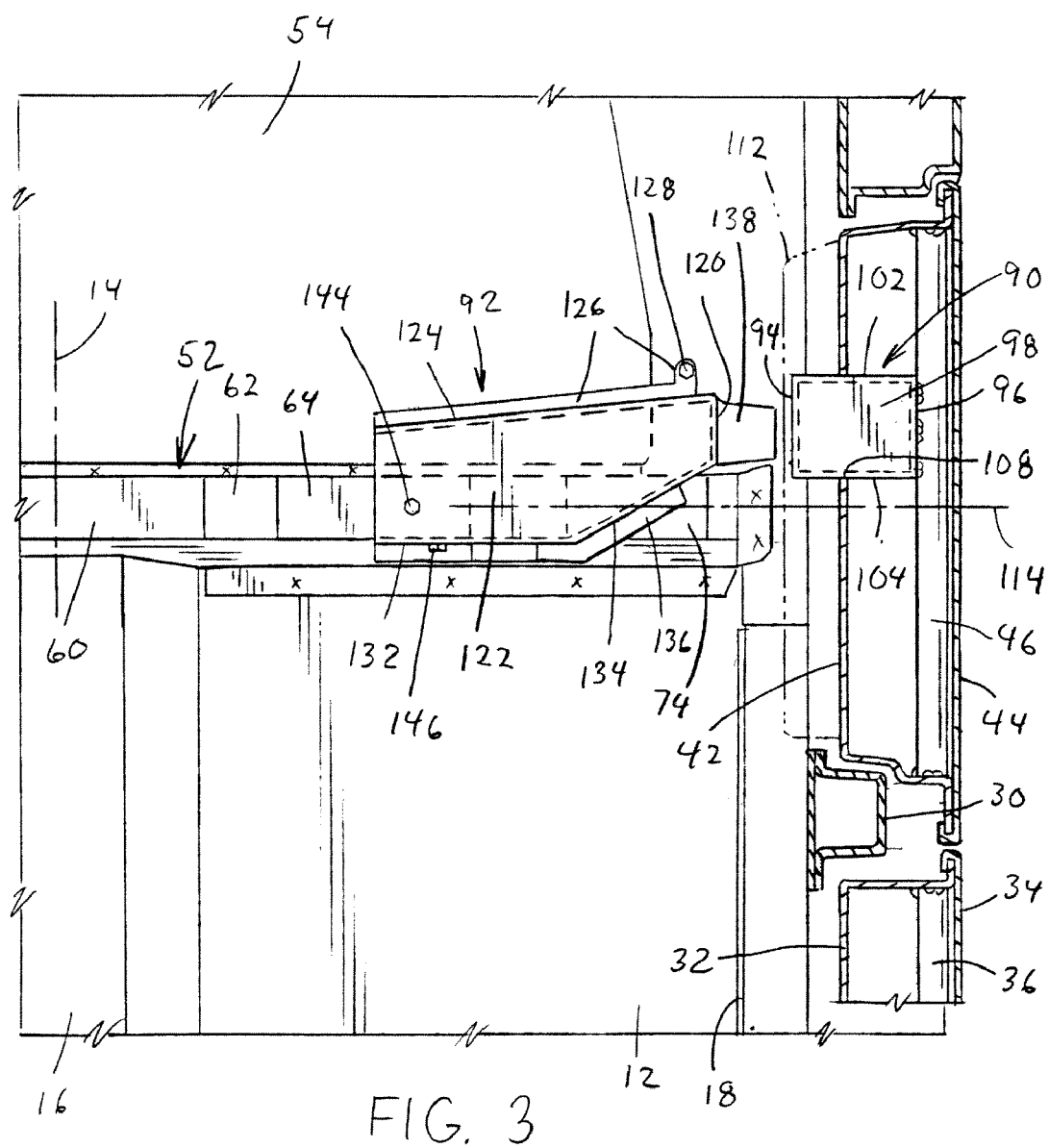
FIG. 3 is a top plan view, with portions shown in cross section, of the lower portion of the vehicle body prior to a side impact crash event.

With continued reference to FIG. 1, a front door inner panel 32 hingedly attaches to the vehicle body (location not shown) so that the door panel 32 is movable between an open position (not shown) and a closed position (shown in FIG. 1). The front door inner panel 32 is forwardly disposed with relation to the center pillar 30. With reference to FIG. 3, the front door inner panel 32 attaches to a front door outer panel 34, which forms a part of the outer skin of the vehicle. A front door beam 36 attaches to one or both of the front door panels 32 and 34 and is disposed in a space between the respective panels. The front door beam 36 provides structural support for the front door of the vehicle during a side impact crash event. The front door inner panel 32 is spaced from the front door outer panel 34, except where the two are connected to one another, to provide a mounting location for the front door beam 36 as well as other components that may be located in the front door, for example a retracted window, controls for retracting a window, lock assemblies, etc. Openings 38 (FIG. 1) are provided in the front door inner panel 32 for providing access to aforementioned components found in the front door.

With reference to FIG. 1, a rear door inner panel 42 hingedly attaches to the vehicle body and is rearwardly disposed with respect to the center pillar 30. With reference to FIG. 3, a rear door outer panel 44 connects at its peripheral edges to the rear door inner panel 42. Both the rear door inner panel 42 and the rear door outer panel 44 are movable between an open position (not shown) and a closed position (depicted in FIGS. 1-4). A rear door beam 46 attaches to both or only one of the rear door inner panel 42 and the rear door outer panel 44. A portion of the rear door inner panel 42, i.e. the portion that does not contact the rear door outer panel 44, is spaced inwardly from the rear door outer panel 44 to provide a space in which the rear door beam 46 is disposed. This space also receives other components of the rear door, such as a retracted window, power lock assemblies and power window motor assemblies. With reference back to FIG. 1, openings 48 are provided in the rear door inner panel 42 to provide access to the aforementioned assemblies.

A cross member, which will be referred to as a mid floor cross member 52, runs across the floor panel 12 in a direction generally perpendicular to both the central axis 14 and the symmetrical axis 24 (FIG. 2). The mid floor cross member 52 is symmetrical with respect to the symmetrical plane in which both the central axis 14 and the symmetrical axis 24 reside. The mid floor cross member 52 attaches at opposite ends to the side sills 22 and also attaches to the floor face 12. The floor panel 12 is forwardly disposed with respect to the mid floor cross member 52. A floor face 54 of a luggage compartment is rearwardly disposed with respect to the mid floor cross member 52. As more clearly seen in FIGS. 3 and 4, the mid floor cross member 52 also attaches to the floor face 54.

The mid floor cross member 52 is a formed piece of metal which is formed having a plurality of surfaces. Since the mid floor cross member 52 is symmetrical with respect to the central axis 14 and the symmetrical axis 24, only one side of the mid floor cross member will be described with particularity taking into account that the other side is a mirror image thereof. The mid floor cross member 52 is a formed to include a central upper horizontal surface 60 that is centered with respect to the central axis 14 and the symmetrical axis 24. An upper angled transition surface 62 depends downwardly and outwardly from the central axis from the central upper horizontal surface 60 towards an intermediate upper horizontal surface 64. The upper angled transition surface 62 interconnects the central upper horizontal surface 60 and the intermediate upper horizontal surface 64.

An intermediate angled transition surface 66 depends downwardly and outwardly from the intermediate upper horizontal surface 64. An outer horizontal surface 74 is located at a lower end of the intermediate angled transition surface 66. An outer angled surface 76 depends outwardly and downwardly from the outer horizontal surface 74 and a connection flange 78 extends outwardly and horizontally from the angled outer surface 76 to provide an attachment location for an end of the mid floor cross member 52 to a respective side sill 22.

The mid floor cross member 52 also includes a vertical surface 82 that extends downwardly from the central upper horizontal surface 60, the upper angled transition surface 62, the intermediate upper horizontal surface 64 and the intermediate angled transition surface 66 towards a connection flange 86, which provides a location for connecting the mid floor cross member 52 to the floor panel 12. Even though the surfaces of the mid floor cross member 52 have been described with great specificity, it can take other configurations.

Box-like shaped reinforcing structures are provided in the vehicle body to provide a secondary load path for the force from a side impact crash event to be transferred to the mid floor cross member 52. A first reinforcing structure, which in the depicted embodiment is a cube-shaped hollow box 90, cooperates with a second reinforcing structure, which in the depicted embodiment is a hollow gusset 92, to transfer the load during a side impact crash event into the mid floor cross member 52.

The box-shaped reinforcing structure 90 connects to at least one of the inner rear door panel 42 and the outer rear door panel 44 (each of which can also be referred to simply as a rear door panel) and includes a vertically disposed contact wall 94 that is horizontally spaced from an attachment wall 96 (FIG. 2) that connects to and contacts the rear door beam 46 (FIG. 2). As most clearly seen in FIG. 5, a top wall 98, side walls 102 and 104, and bottom wall 106 interconnect the contact wall 94 and the attachment wall 96 spacing the former from the latter. With reference back to FIG. 1, the box-shaped reinforcing structure 90 extends through a rectangular reinforcing structure opening 108 formed in the inner rear door panel 42 so that the contact wall 94 of the first reinforcing structure 90 is spaced inwardly from the rear door inner panel 42, which reduces the distance that the contact wall 94 travels prior to contacting the second reinforcing structure 92 during a side impact crash event. Inner vehicle padding and trim 112 (depicted schematically in FIGS. 2-4) covers the box-like reinforcing structure 90 so that it is not noticeable to a passenger riding in the vehicle cabin. The first reinforcing structure 90 can take alternative configurations, e.g. cylindrical. The reinforcing structure opening 108 may take other shapes to accommodate a differently shaped first reinforcing structure.

The first reinforcing structure 90 is positioned in the lower portion of the rear door and is rearwardly spaced from the center pillar 30. As more clearly seen in FIG. 3, the first reinforcing structure 90, and more particularly the contact wall 94, is also offset rearwardly from a longitudinal axis 114 of the mid floor cross member 52, the longitudinal axis being perpendicular to both the central axis 14 and the symmetrical axis 24 in a direction parallel to the central axis 14. Such a configuration lessens the inward intrusion of the inner rear door panel 42 that is positioned between the center pillar 30 and the first reinforcing structure 90 as well as the center pillar 30 itself during the side impact crash event. In view of this configuration, the second reinforcing structure 92 is formed to accommodate the rearward offset of the first reinforcing structure 90 from the longitudinal axis 114 of the mid floor cross member 52.

The second reinforcing structure, which in the depicted embodiment is referred to a gusset 92, connects to each end of the mid floor cross member 52. The gusset 92 includes a vertical impact wall 120 that is struck by the contact wall 94 of the first reinforcing structure 90 during a side impact crash event (see FIG. 4). The gusset 92 is shaped in a manner to provide a plurality of attachment surfaces for attaching the gusset 92 to the mid floor cross member 52 as well as the floor face 54 of the luggage compartment. Additionally, the gusset 92 is shaped in a manner to allow the impact wall 120 to be offset from longitudinal axis 114 of the mid floor cross member 52 (see FIG. 3).

Figure 5:
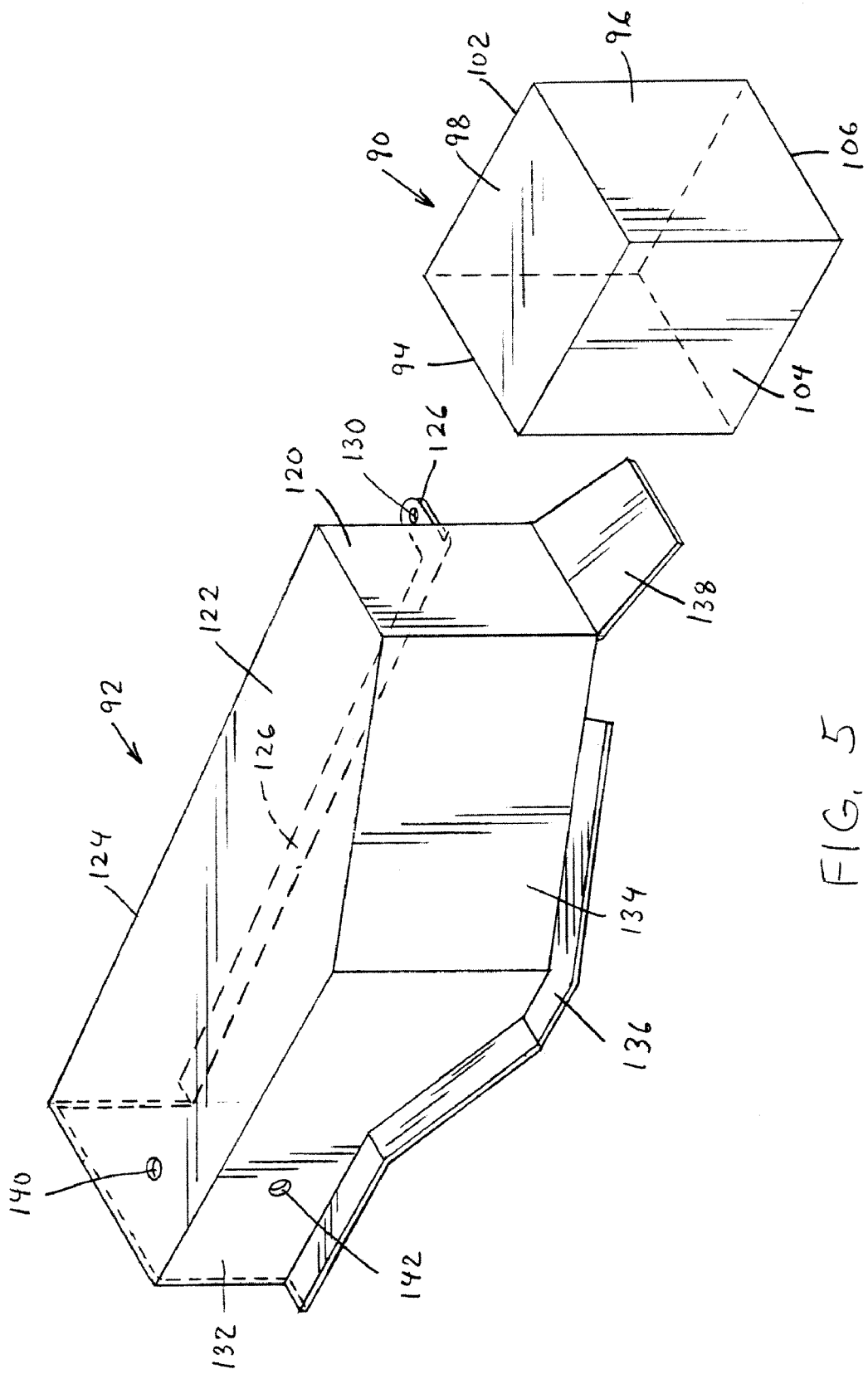
FIG. 5 is a perspective view of the side impact crash event body structure improvements found in the vehicle body shown in FIGS. 1-4.

With reference to FIG. 5, the gusset 92 includes an upper horizontal wall 122 that extends inwardly from the vertical impact wall 120. The upper horizontal wall 122 provides a surface for attaching the gusset 92 to the intermediate upper horizontal surface 64 of the mid floor cross member 52, as more clearly seen in FIGS. 2 and 3. In the depicted embodiment, the gusset 92 is attached to the mid floor cross member 52 and the floor face 54 via mechanical fasteners, e.g. bolts, however, other conventional manners for attaching the two metallic pieces to one another can also be used, for example welding and the like.

A rearward vertical wall 124 extends perpendicularly downwardly from a rear edge the upper horizontal wall 122 and rearwardly from the vertical impact wall 120. A rearward attachment flange 126 extends rearwardly and perpendicularly outwardly from the rearward vertical wall 124. The attachment flange 126 contacts the floor face 54 of the luggage compartment and is fastened thereto, typically via a bolt 128 (FIG. 3) extending through an opening 130 in the attachment flange and an opening (not visible) in the floor face.

A forward vertical wall 132 extends perpendicularly downward from the upper horizontal wall 122 and thus parallel to the rearward vertical wall 124. A forward angled wall 134 interconnects the forward vertical wall 132 and the impact wall 120. The forward angled wall 134 also depends perpendicularly downward from the upper horizontal wall 122. A forward flange 136 extends forwardly from both the forward vertical wall 132 and the forward angled wall 134. The forward flange 136 contacts the outer horizontal surface 74 of the mid floor cross member 52 (see FIG. 3). A side flange 138 extends at an obtuse angle from the impact wall 120 outwardly therefrom. The side flange 138 contacts the floor face 54 in the luggage compartment and is rearwardly offset from the longitudinal axis 114 of mid floor cross member 52 (see FIG. 3).

In addition to the opening 130 provided in the rearward attachment flange 126, an opening 140 is provided in the upper horizontal wall 122 and an opening 142 is provided in the forward vertical wall 132 each for receiving mechanical fasteners. Corresponding aligned openings (not visible) are provided in the mid floor cross member 52 to receive bolts 144 (FIGS. 3 and 4) and 146 (FIG. 1) to connect the gusset 92 to the cross member. As discussed above, the gusset can attach to the cross member in other manners.

Figure 4:
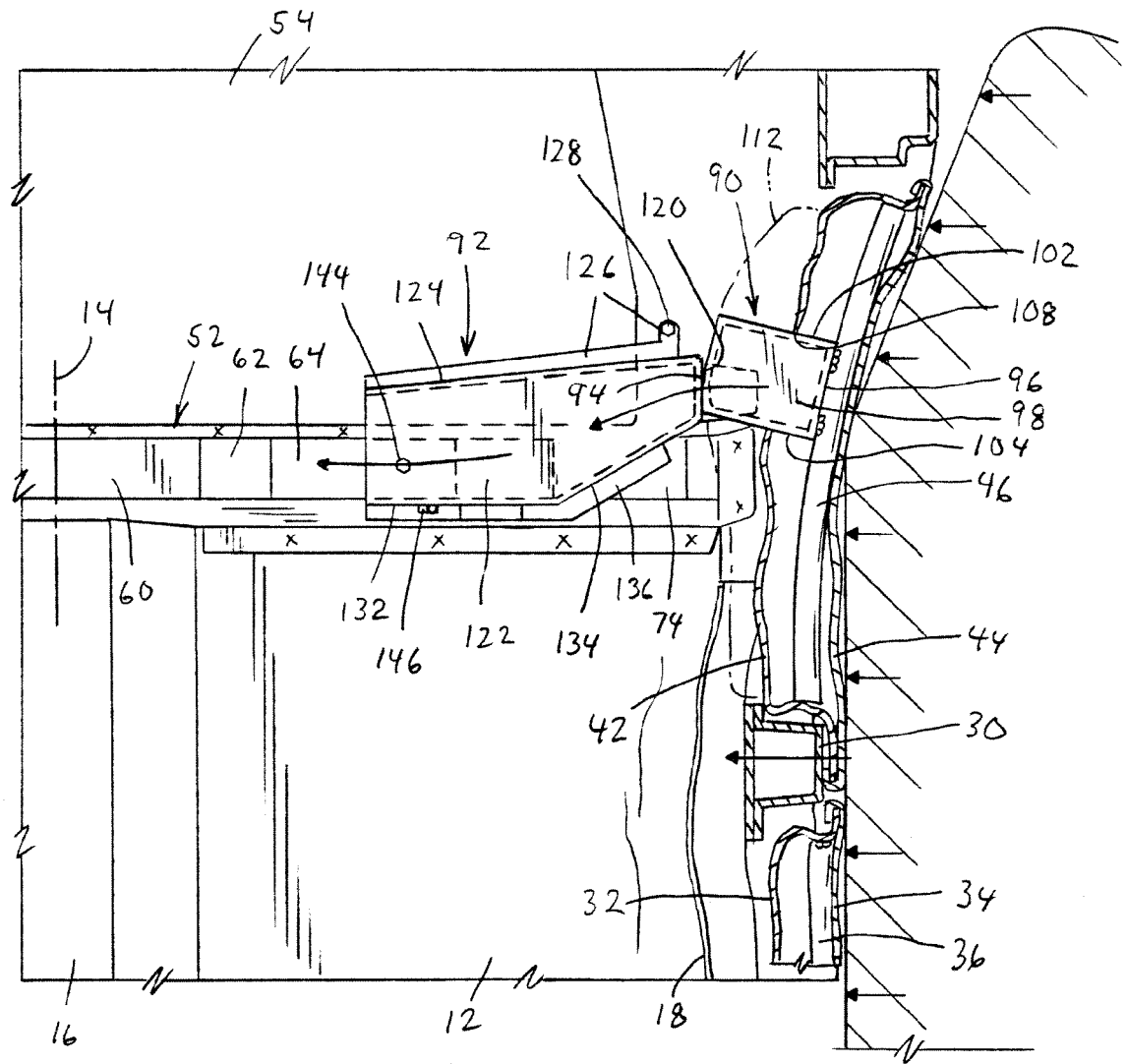
FIG. 4 is a top plan view similar to FIG. 3, however, shown after the side impact crash event.

With reference to FIGS. 3 and 4, in FIG. 3 the vehicle body is shown prior to a side impact crash event and in FIG. 4 the vehicle body is shown after or during a side impact crash event. As discussed above, the center pillar intrusion is the standard by which the survival space of the cabin is assessed. Typically the center pillar is the primary load carrying member during a side impact crash vent. By providing reinforcing structures that are rearwardly offset from the center pillar and arranging these structures to provide a secondary load path through the mid floor cross member, the survival space is increased. With reference to FIG. 4, during a side impact crash event the contact wall 94 of the box 90 contacts the impact wall 120 of the gusset 92 thus transferring some of the load from the side impact crash event through the mid floor cross member 52.

A vehicle body that includes reinforcing structures to provide a secondary load path during a side impact crash event has been described with particularity. Modifications and alterations will occur to those reading and understanding the preceding detailed description. The invention is not to be limited to only those embodiments disclosed. Instead, the invention is broadly defined by the appended claims and the equivalents thereof.

The invention claimed is:

1. A vehicle body comprising:
a floor panel defining a central axis;
first and second side sills connected, respectively, to opposite sides of the floor panel;
a cross member defining a longitudinal axis perpendicular to the central axis and extending between the side sills and connected to each side sill;
a rear door panel;
a first reinforcing structure connected to the rear door panel;
a second reinforcing structure connected to the cross member and arranged with respect to the first reinforcing structure such that the first reinforcing structure contacts the second reinforcing structure during a side impact crash event to transfer load into the cross member.

2. The body of claim 1, wherein the first reinforcing structure comprises a generally box-shaped member and a portion of the member extends inwardly beyond to rear door panel.

3. The body of claim 1 further comprising a rear door reinforcing beam connected to the rear door panel, the first reinforcing structure being connected to the rear door reinforcing beam.

4. The body of claim 1, wherein the second reinforcing structure includes an impact wall that contacts the first reinforcing structure during the side impact crash event, the impact wall being offset from the longitudinal axis of the cross member in a direction parallel to the central axis.

5. The body of claim 1, wherein the cross member contacts the floor panel between the side sills.

6. The body of claim 1, wherein the floor panel includes a floor tunnel formed along the central axis.

7. The body of claim 1, wherein the rear door panel includes an opening and the first reinforcing structure extends through the opening.

8. The body of claim 1, further comprising a floor face of a luggage compartment rearwardly disposed with respect to the cross member, wherein the cross member contacts the floor face between the side sills.

9. The vehicle body of claim 1, wherein the first reinforcing structure is rearwardly offset with respect to the longitudinal axis.

10. A vehicle body comprising:
a floor panel defining a central axis;
first and second side sills connected, respectively, to opposite sides of the floor panel;
a cross member connected to the floor panel and extending in a direction generally perpendicular to the central axis;
a rear door panel movable between an open position and a closed position;
a rear door reinforcing beam connected to the rear door panel;
a first reinforcing structure connected to the rear door reinforcing beam and including a contact wall spaced inwardly from the rear door panel towards the cross member; and
a second reinforcing structure connected to the cross member and arranged with respect to the first reinforcing structure such that when the rear door panel is in the closed position the contact wall of the first reinforcing structure contacts the second reinforcing structure during a side impact crash event to transfer load into the cross member, wherein the second reinforcing structure includes an impact wall that contacts the contact wall of the first reinforcing structure during the side impact crash event, the impact wall and the contact wall being offset from a longitudinal axis of the cross member in a direction parallel to the central axis.

11. The body of claim 10, further comprising a center pillar extending upwardly from the floor panel, the center pillar being offset from the cross member in a forward direction and the contact wall being offset from the longitudinal axis in a rearward direction.

12. The body of claim 10, wherein the cross member connects at a first end to the first side sill and at a second end to the second side sill.

13. The body of claim 10, wherein the rear door panel is an inner rear door panel and the body further comprises an outer rear door panel connected to the inner rear door panel, the rear door reinforcing beam being located between the inner rear door panel and the outer rear door panel.

14. The body of claim 13, wherein the inner rear door panel includes an opening and the first reinforcing structure extends through the opening.

15. The body of claim 10, wherein the first reinforcing structure comprises a generally box-shaped member.

16. A vehicle body comprising:
a floor panel defining a central axis;
a first side sill connected to a first side of the floor panel;
a second side sill connected to a second side of the floor panel;
a cross member extending generally perpendicular to the central axis and connected to each side sill;
an inner rear door panel;
an outer rear door panel connected to the inner rear door panel and including a portion spaced from the inner rear door panel;
a first reinforcing structure connected to at least one of the inner rear door panel and the outer rear door panel, the first reinforcing structure including a contact wall spaced from the inner rear door panel in a direction away from the outer rear door panel, the contact wall being offset from a longitudinal axis of the cross member in a rearward direction;
a second reinforcing structure connected to the cross member and arranged with respect to the first reinforcing structure such that the contact wall of the first reinforcing structure contacts the second reinforcing structure during a side impact crash event to transfer load into the cross member, the second reinforcing structure includes an impact wall that contacts the contact wall of the first reinforcing structure during the side impact crash event, the impact wall being offset from the longitudinal axis of the cross member in a rearward direction.

17. The body of claim 16, wherein a portion of the first reinforcing structure is positioned between the inner rear door panel and the outer rear door panel.

18. The body of claim 17, further comprising a rear door reinforcing beam disposed between the inner rear door panel and the outer rear door panel and the first reinforcing structure is connected to the rear door reinforcing beam.

19. The body of claim 16, further comprising a center pillar extending upwardly from the floor panel, the center pillar being offset from the cross member in a forward direction.

20. The body of claim 16, wherein the inner rear door panel includes an opening and the second reinforcing structure extends through the opening.

* * * * *